US011619607B2

United States Patent
Gu et al.

(10) Patent No.: US 11,619,607 B2
(45) Date of Patent: Apr. 4, 2023

(54) DIAGNOSTIC WAVEFORM GENERATOR FOR A SENSOR

(71) Applicant: Analog Devices International Unlimited Company, Limerick (IE)

(72) Inventors: Shurong Gu, Beijing (CN); Hanqing Wang, Beijing (CN); GuangYang Qu, Beijing (CN); Dennis A. Dempsey, Newport (IE)

(73) Assignee: Analog Devices International Unlimited Company, Limerick (IE)

( * ) Notice: Subject to any disclaimer, the term of this patent is extended or adjusted under 35 U.S.C. 154(b) by 50 days.

(21) Appl. No.: 16/921,368

(22) Filed: Jul. 6, 2020

(65) Prior Publication Data

US 2020/0333288 A1  Oct. 22, 2020

Related U.S. Application Data

(62) Division of application No. 15/586,942, filed on May 4, 2017, now Pat. No. 10,739,306.

(51) Int. Cl.
*G01N 27/416* (2006.01)
*G01N 27/48* (2006.01)

(52) U.S. Cl.
CPC ....... *G01N 27/4163* (2013.01); *G01N 27/416* (2013.01)

(58) Field of Classification Search
CPC ............ G01N 27/3277; G01N 27/327; G01N 27/3272; G01N 27/40; G01N 27/48; G01N 27/26; G01N 27/10; G01N 27/06; G01N 27/416; G01N 27/4163–4165
See application file for complete search history.

(56) References Cited

U.S. PATENT DOCUMENTS

| | | | |
|---|---|---|---|
| 5,980,708 | A | 11/1999 | Champagne et al. |
| 6,554,469 | B1 | 4/2003 | Thomson et al. |
| 10,739,306 | B2 | 8/2020 | Gu et al. |
| 2003/0206021 | A1 | 11/2003 | Laletin et al. |
| 2010/0169035 | A1 | 7/2010 | Liang et al. |
| 2018/0321187 | A1 | 11/2018 | Gu et al. |

OTHER PUBLICATIONS

"Chinese Application Serial No. 201810420630.2, Office Action dated Jul. 9, 2020", w/ English Translation, 7 pgs.
(Continued)

*Primary Examiner* — Gurpreet Kaur
(74) *Attorney, Agent, or Firm* — Schwegman Lundberg & Woessner, P.A.

(57) ABSTRACT

Techniques for generating a diagnostic waveform for a sensor are provided. In an example, a control circuit for an electrochemical sensor can include power supply inputs configured to receive a supply voltage, a first signal generator configured to receive control information and to generate a first signal on a first output using the supply voltage and the control information, a second signal generator configured to receive the control information and to provide a second signal on a second output, using the supply voltage and the control information. An output voltage between the first output and the second output, in a diagnostic mode of operation of the control circuit, can include a periodic signal having a peak-to-peak voltage greater than the supply voltage.

20 Claims, 4 Drawing Sheets

(56) References Cited

OTHER PUBLICATIONS

"Chinese Application Serial No. 201810420630.2, Response filed Sep. 22, 2020 to Office Action dated Jul. 9, 2020", w/ English Claimes, 11 pgs.

"U.S. Appl. No. 15/586,942, Non Final Office Action dated Oct. 2, 2019", 10 pgs.

"U.S. Appl. No. 15/586,942, Notice of Allowance dated Apr. 8, 2020", 8 pgs.

"U.S. Appl. No. 15/586,942, Response filed Jan. 2, 2020 to Non Final Office Action dated Oct. 2, 2019", 7 pgs.

"U.S. Appl. No. 15/586,942, Response filed Aug. 14, 2019 to Restriction Requirement dated Jun. 14, 2019", 7 pgs.

"U.S. Appl. No. 15/586,942, Restriction Requirement dated Jun. 14, 2019", 9 pgs.

"Chinese Application Serial No. 201810420630.2, Office Action dated Nov. 22, 2019", W/O English Translation, 5 pgs.

DIAGNOSTIC WAVEFORM GENERATOR FOR A SENSOR

CROSS-REFERENCE TO RELATED APPLICATIONS

This application is a division of U.S. patent application Ser. No. 15/586,942, filed May 4, 2017, which is incorporated by reference herein in its entirety.

BACKGROUND

To ensure customer satisfaction and trust in a product, manufacturers often test their products before placing them on the market or shipping the products to a customer. In some situations, sensor performance can be questioned when a system encounters unexpected results. It can be difficult to assess whether a system component such as the sensor cause the unexpected results without testing the sensor. However, sensor testing, such as for electrochemical sensors, can require external, specialized equipment to generate test signals which can be cumbersome and resource expensive.

Overview

Techniques for generating a diagnostic waveform from a sensor controller are provided. Such techniques can allow for a system including an electrochemical sensor and a sensor controller to have self-diagnostic capabilities, circumventing the burden of procuring and using specialized testing equipment in certain situations. In an example, a control circuit for an electrochemical sensor can include power supply inputs configured to receive a supply voltage, a first signal generator configured to receive control information and to generate a first signal on a first output using the supply voltage and the control information, a second signal generator configured to receive the control information and to provide a second signal on a second output, using the supply voltage and the control information. An output voltage between the first output and the second output, in a diagnostic mode of operation of the control circuit, can include a diagnostic waveform, such as, but not limited to, a periodic signal having a peak-to-peak voltage greater than the supply voltage.

This overview is intended to provide a general overview of subject matter of the present patent application. It is not intended to provide an exclusive or exhaustive explanation of the invention. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

The present inventors have recognized apparatus and methods for providing a diagnostic waveform having a peak-to-peak voltage variation that is significantly larger than supply voltage used to power the apparatus and without using a voltage converter to supply the diagnostic waveform hardware. In certain examples, the solutions provided can use less energy and can capitalize on the advantages of using lower supply voltages.

Figure 1:
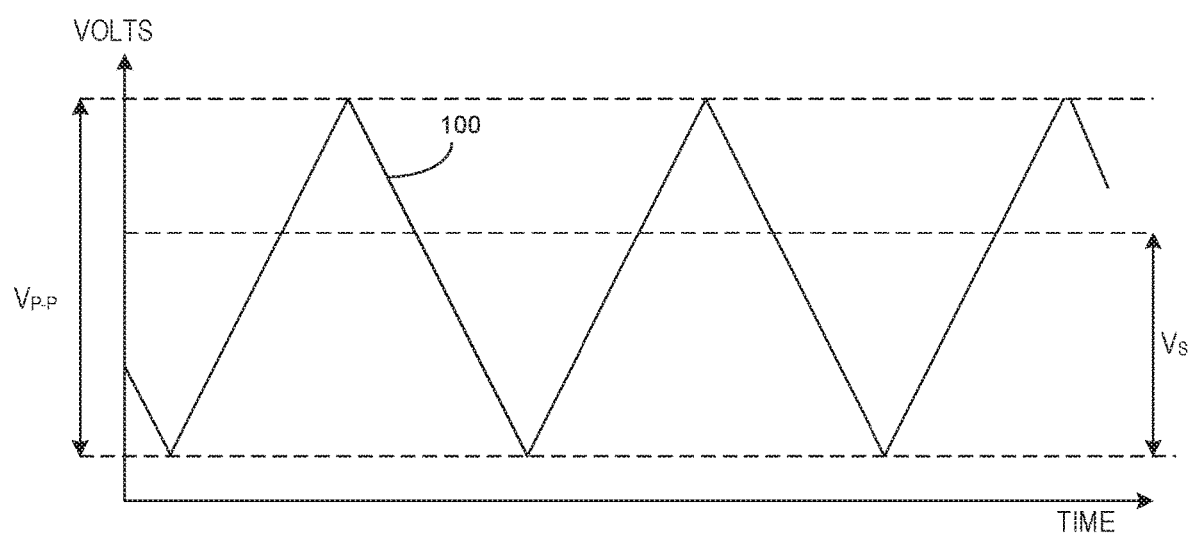
FIG. 1 illustrates generally a diagnostic waveform for a sensor such as an electrochemical sensor.

FIG. 1 illustrates generally a diagnostic waveform 100 for a sensor such as an electrochemical sensor. In certain examples, the peak-to-peak voltage ($V_{P-P}$) can be larger than a supply voltage ($V_S$) of the waveform generator providing the diagnostic waveform 100. In some examples, the peak-to-peak voltage ($V_{P-P}$) can be about 3.6 volts or more. In certain examples, the diagnostic waveform 100 can be applied to terminals of the sensor and current can be measured and analyzed to determine certain operating conditions of the sensor. In some examples, the diagnostic waveform 100 can be applied to first terminals of the sensor and voltage or current can be measured and analyzed via second terminals of the sensor to determine certain operating conditions of the sensor. The illustrated waveform of FIG. 1 can be used for cyclic voltammetry. Cyclic voltammetry is a particular version of voltammetry that makes use of repetitive voltage signals to promote complementary electrochemical processes and to evaluate the signals provided by the electrochemical sensor. The resulting current waveform can contain at least two superposed contributions: the current charging the capacitance of the investigated system and the current due to the electrochemical processes occurring at the electrode(s). The capacitive current component is proportional to the voltage sweep (scan) rate having the double layer capacitance as a proportionality constant. Charge transfer reactions or specific chemisorption processes at the electrodes can result in faradaic responses that can lead to the formation of current peaks in the output signals of the electrochemical sensor. In gas sensor application, cyclic voltammetry can allow correlation of the amount of analyte absorbed in the sensing element with the analyte partial pressure in the gas phase by using, for example, the change of the diffusion current. Also the capacitive current dependency on the scan rate can give useful information on the gaseous analyte sorption, similar to that obtained through electrochemical impedance spectroscopy at low frequency.

Figure 2:
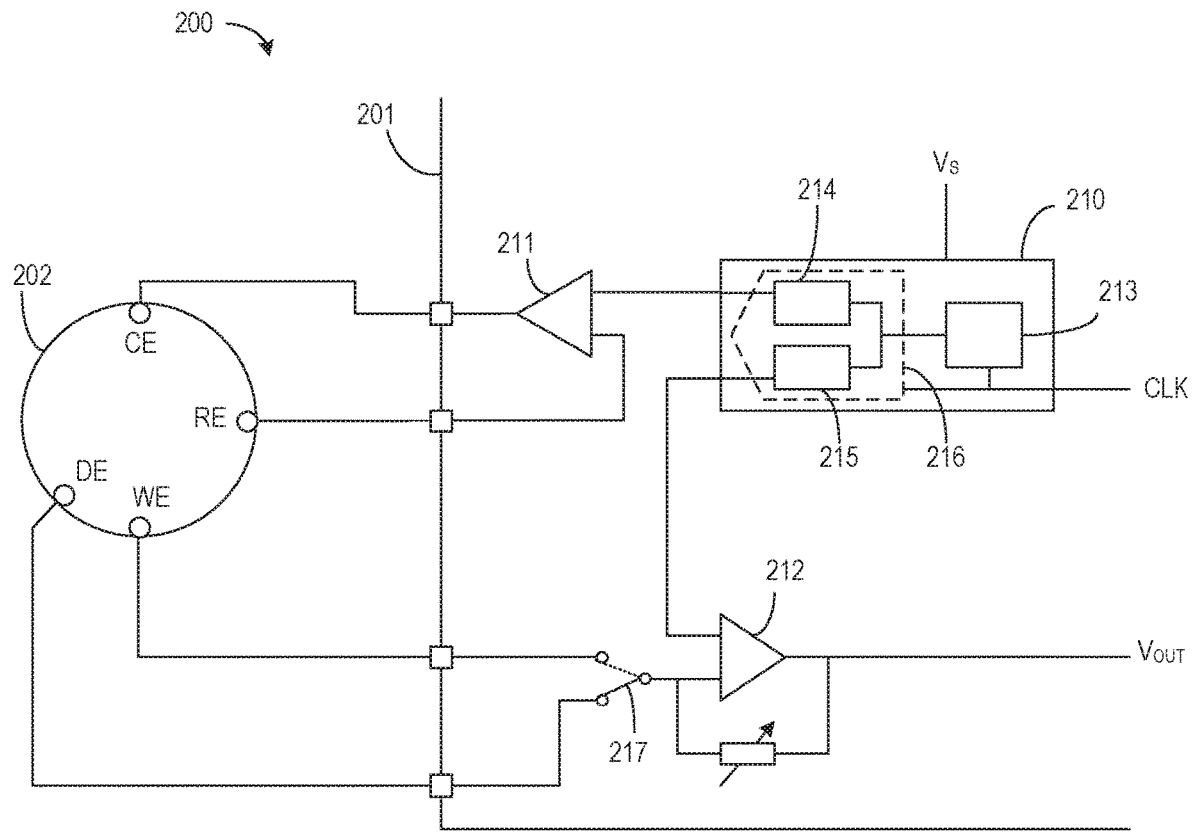
FIG. 2 illustrates a system including a sensor controller and an electrochemical sensor.

FIG. 2 illustrates generally a sensor system 200 including a sensor controller 201 and an electrochemical sensor 202. Electrochemical 202 sensors can include multiple terminals. In general, the sensor 202 is designed to provide a current that is indicative of a concentration of a target chemical where the sensor 202 is located. In certain examples, the sensor 202 can initiate, for example, oxidation or reduction of a material exposed to the chemical and the oxidation or reduction can influence a current conducted through what is typically called a working electrode (WE) of the sensor 202. The sensor controller 201 can measure, amplify and process the current provided by the sensor 202 to indicate the chemical concentration. In certain examples, the sensor controller 201 can also maintain an electrical aspect of the sensor 202 such as maintaining a predetermined offset between terminals of the sensor such that the current sensed from the sensor 202 can be referenced to a concentration model associated with the sensor 202.

In certain examples, the sensor controller 201 can operate in at least two modes of operation. In certain examples, in a first mode of operation, a sensing mode, the sensor controller 201 can apply a bias voltage between the counter electrode (CE) and the working electrode (WE) and can receive sense information from the working electrode (WE). For sensors with a reference electrode (RE), the controller, during the first mode of operation can also adjust the current applied to counter electrode (CE) so as to maintain a predetermined voltage between the working electrode (WE) and the reference electrode (RE). A first amplifier of the sensor controller, an excitation amplifier, can be used to compare a representation of the voltage at the reference electrode (RE) to a reference ($V_{BIAS}$) and adjust the current supplied to the counter electrode (CE). In the sensing mode, a second amplifier 212 can receive the sense information from the working electrode and can provide an indication ($V_{OUT}$) of, for example, a material concentration in an environment about the sensor 202. In certain examples, in a second mode of operation, a diagnostic mode, the sensor controller 201 can apply a diagnostic waveform to the sensor 202 and can monitor and analyze signals that respond to the waveform to provide diagnostic information about the sensor 202. In certain examples, a switch 217 can be used to couple and input of the second amplifier 212 to working electrode in the sensing mode and the diagnostic electrode in the diagnostic mode.

As discussed above, in certain examples, the sensor controller 201 can monitor certain aspects of the sensor 202 to provide diagnostic information that can be used for a number of purposes including detecting sensor faults, providing calibration information, etc. One method of monitoring can employ applying a known diagnostic waveform to the sensor 202 and monitoring various electrical characteristics of the sensor 202 in response to the diagnostic waveform. In certain examples, the sensor system 200 including the sensor 202 and the sensor controller 201 can be designed for low power operation as they can be standalone systems. A system power supply may be from a power supply circuit or network (e.g., switched mode power supply and/or a linear regulator). The power may also be supplied directly from a battery. A capacitor may be used as an energy storage element in combination with the energy supply system. In certain examples, the peak-to-peak voltage of the diagnostic waveform can exceed the voltage provided by the power supply. For example, some systems can include a power supply that provides a nominal 3.45 volts or less and the diagnostic waveform can include a peak-to-peak voltage of 3.5 volts or more.

In certain examples, the sensor controller 201 can include a signal generator circuit 210, a first or excitation amplifier 211 and a second or sense amplifier 212. In a diagnostic mode of operation of the sensor controller 201, the signal generator circuit 210 can generate a diagnostic waveform having a peak-to-peak voltage that is greater than the voltage level supplied to the signal generator circuit 210. In certain examples, the diagnostic waveform can be applied to the sensor across the reference electrode (RE) and a diagnostic electrode (DE). In some examples, a first output of the signal generator circuit 210 can be coupled to a first output of the sensor controller 201 via a virtual short between inputs of the excitation amplifier 211. In some examples, a second output of the signal generator circuit 210 can be coupled to a second output of the sensor controller 201 via a virtual short between inputs of the sense amplifier 212. In certain examples, the signal generator circuit 210 can include a digital reference controller 213 and two output circuits 214, 215. In some examples, the two output circuits 214, 215 can include one or two digital-to-analog converters (DACs). In some examples, an optional dual output DAC 216 can include the two output circuits 214, 215. In the diagnostic mode, each output circuit 214, 215 can be powered using a voltage level ($V_S$) that can allow the each output circuit 214, 215 to provide at least one half of the peak-to-peak voltage of the diagnostic waveform. In the diagnostic mode, the digital reference controller 213 can receive a clock signal (CLK) and can provide digital inputs to each output circuit 214, 215, or the dual output DAC 216, such that the voltage between the two outputs of the signal generator circuit 210, over time, follows the plot of FIG. 1.

In certain examples, the sensor controller 201 can be part of an integrated circuit, including but not limited to system-in-package (SIP), multi-chip modules (MCMs), etc. In certain examples, the integrated circuit sensor controller can also include sensing electronics such as an analog-to-digital converter to provide a digital representation of the sense information received from the electrochemical sensor 201. In certain examples, the electrochemical sensor 201 can include, but is not limited to, a gas electrochemical sensor, a liquid electrochemical sensor, or combinations thereof. Such sensors can be used in a variety of industrial, medical, mobile and consumer applications including, but not limited to, biological sensing, such as blood glucose sensing, for example, air quality sensing, instrumentation, actuation, etc.

Figure 3A:
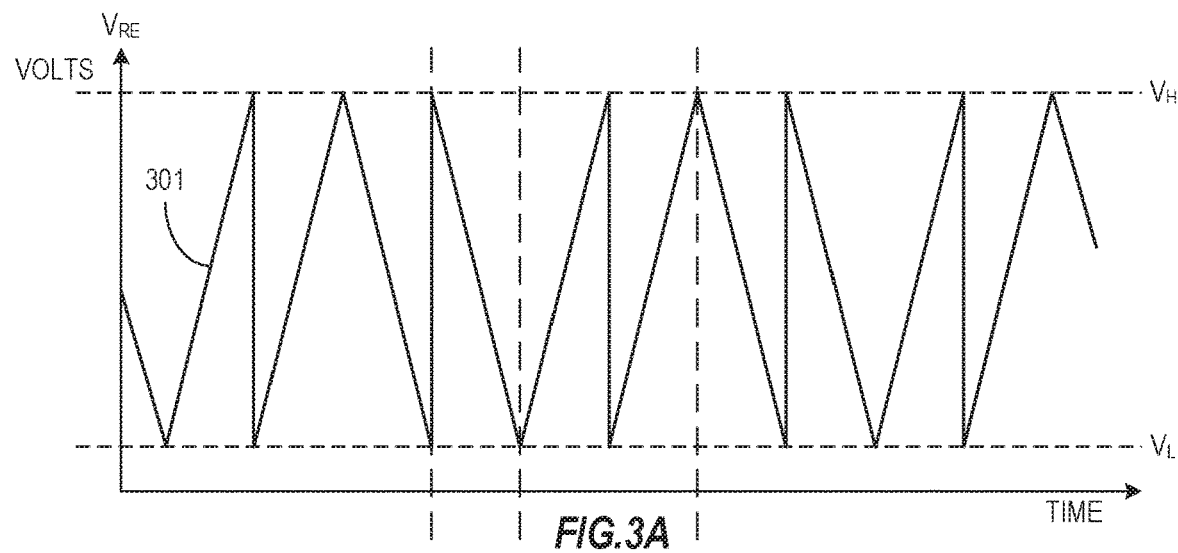
FIG. 3A-3C illustrate generally example output waveforms for the individual terminals referenced to ground and the differential waveform at the terminals.
Figure 3B:
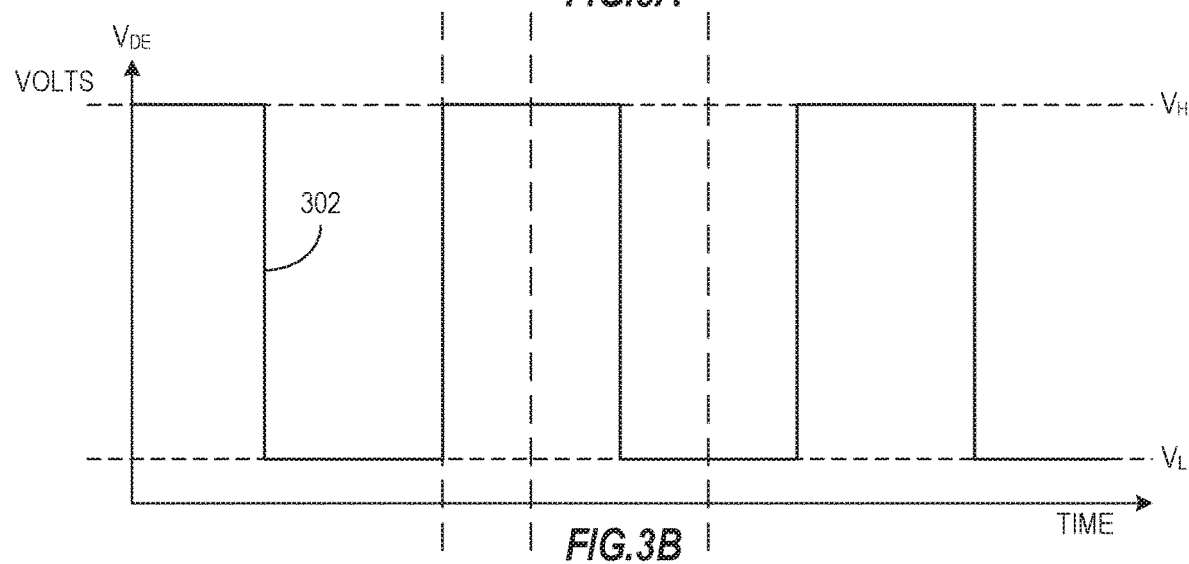
Figure 3C:
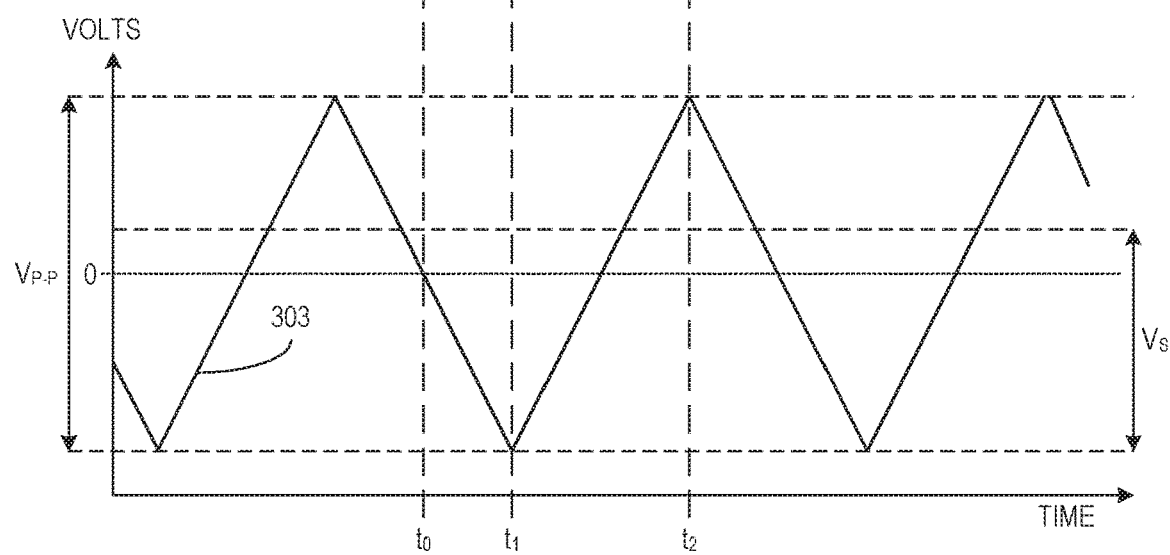

FIGS. 3A-3C illustrate generally a graphic representation of example output signals 301, 302 provided by the waveform generator to produce the diagnostic waveform 303 illustrated in FIG. 1 and FIG. 3C. In certain examples, the signal generator can include a controller, a DAC converter to provide the first output signal 301 and a logic circuit to provide the second output signal 302. In some examples, the signal generator can include a second DAC instead of or in addition to the logic circuit to provide the second output signal 302. In some examples, a dual output DAC can provide the first output signal 301 and the second output signal 302. In such an example, additional diagnostic waveform shapes can be realized and can include, but are not limited to, ramp diagnostic waveforms, cyclical or alternating diagnostic waveforms including sinusoidal diagnostic waveforms, staircase diagnostic waveforms, square wave or pulse diagnostic waveforms and combinations thereof. In certain examples, a ramp waveform generated by a DAC can include steps (staircase waveform) used to generate the ramp within the DAC resolution and accuracy induced quantization limits of the DAC. In some applications, steps associated with a ramp waveform can be desired and useful for identifying additional characteristics of an electrochemical sensor beyond a true linear ramp waveform.

In an example using a triangular, periodic, diagnostic waveform, the first output signal 301 can a pattern that includes a combination of a ramp and a step function operating between a lower voltage ($V_L$) and a higher voltage ($V_H$). The second output signal 302 can include a repeating pattern of a step function operating between the lower voltage ($V_L$) and the higher voltage ($V_H$). In certain examples, the first signal 301 and the second signal 302 can be applied to the reference electrode (RE) and the diagnostic electrode (DE), respectively. In certain examples, the controller of the signal generator can provide digital signals to time and control the ramp, step and delay functions of the DAC and the step function of the logic circuit to provide the diagnostic waveform 303 illustrated in FIG. 3C, as the diagnostic waveform 303 would appear if measured with a positive voltage probe applied to the reference electrode (RE) and a negative voltage probe applied to the diagnostic electrode (DE). As can be observed, the diagnostic waveform 303 can have a peak-to-peak voltage ($V_{P-P}$) that is higher than the voltage ($V_S$) supplied to the signal generator. In some examples, the supply voltage ($V_S$) of the signal generator can be between 2.5 volts and 3.1 volts. As an example, the DAC and logic circuits can provide an output voltage between about 2.0 volts and about 0.2 volts, and the diagnostic waveform can have a peak-to-peak voltage of 3.6 volts. Using the above values as examples in FIGS. 3A-3C, at t0, $V_{RE}$ can be 2.0 volts and $V_{DE}$ can be 2.0 volts, thus, the potential between the RE electrode and the DE electrode can be $V_{RE}-V_{DE}=(2.0-2.0)=0$ volts. At t1, $V_{RE}$ can be 0.2 volts and $V_{DE}$ can be 2.0 volts, thus, the potential between the RE electrode and the DE electrode can be $V_{RE}-V_{DE}=(0.2-2.0)$ $=-1.8$ volts. At t2, $V_{RE}$ can be 2.0 volts and $V_{DE}$ can be 0.2 volts, thus, the potential between the RE electrode and the DE electrode can be $V_{RE}-V_{DE}=(2.0-0.2)=+1.8$ volts. Over time, FIG. 3C illustrates the waveform present at the RE electrode and the DE electrode and can have a peak-to-peak voltage ($V_{P-P}$) of 3.6 volts. It is understood that other values for the high voltage ($V_H$), the low voltage ($V_L$) are possible without departing from the scope of the present subject matter.

Figure 4:
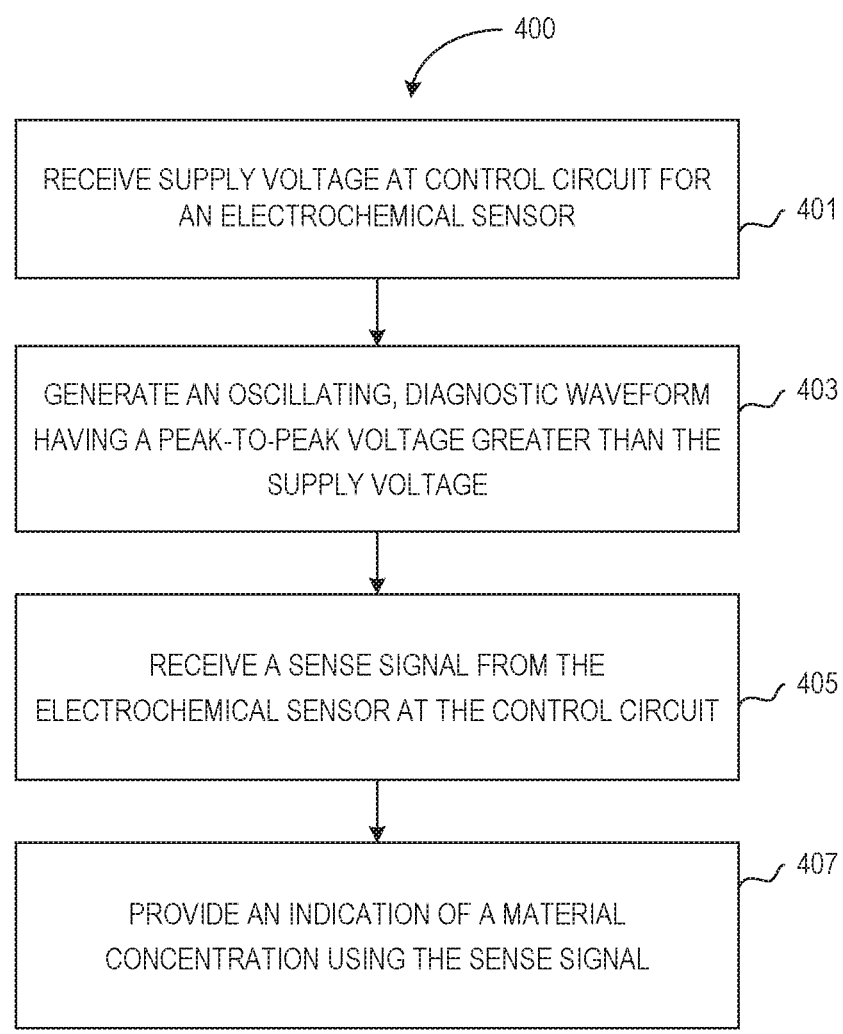
FIG. 4 illustrates generally a flowchart of an example method of providing a diagnostic waveform for an electrochemical sensor using a waveform generator of a sensor controller.

FIG. 4 illustrates generally a flowchart of an example method 400 of providing a diagnostic waveform for an electrochemical sensor using a waveform generator of a sensor controller. At 401, supply voltage can be received at a controller for an electrochemical sensor. In certain examples, during a sense mode of operation of the controller, a first amplifier can compare a feedback voltage of the electrochemical sensor and can adjust a current supplied to the electrochemical sensor to maintain a bias voltage between terminals of the electrochemical sensor. At 403, the controller can generate a periodic, diagnostic waveform, such as a triangular or sinusoidal waveform, having a peak-to-peak voltage greater than the supply voltage, such as during a diagnostic mode of operation. At, 405, the controller can receive a sense signal from the electrochemical sensor. In a sense mode of operation of the controller, the sense signal can be received from the working electrode of the electrochemical sensor. In the diagnostic mode of operation of the controller, the sense signal can be received from one or more of the diagnostic electrode or working electrode of the electrochemical sensor. At 407, during the sense mode of operation of the controller, a second amplifier, such as a trans-impedance amplifier, can provide a voltage indicative of a concentration of material in the environment about the electrochemical sensor.

Various Notes & Examples

In Aspect 1, a control circuit for an electrochemical sensor can include power supply inputs configured to receive a supply voltage, a first signal generator configured to receive control information and to generate a first waveform on a first output using the supply voltage and the control information, a second signal generator configured to receive the control information and to provide a second waveform on a second output using the supply voltage and the control information, and wherein an output voltage between the first output and the second output, in the diagnostic mode of operation of the control circuit, is a periodic waveform having a peak-to-peak voltage greater than the supply voltage.

In Aspect 2, the control circuit of Aspect 1 optionally includes a controller configured to generate the control information.

In Aspect 3, the first waveform of any one or more of Aspects 1-2 optionally includes a repeating pattern of a first voltage ramp and a second voltage ramp and the first signal generator is configured to generate the first voltage ramp and the second voltage ramp.

In Aspect 4, the first signal generator of any one or more of Aspects 1-3 optionally is a first digital-to-analog converter (DAC).

In Aspect 5, the second waveform of any one or more of Aspects 1-4 optionally includes a repeating pulse waveform, and the second voltage generator optionally is configured to oscillate the second output between a first voltage and a second voltage to generate the repeating pulse waveform.

In Aspect 6, the second signal generator of any one or more of Aspects 1-5 optionally is a second DAC.

In Aspect 7, the control circuit of any one or more of Aspects 1-6 optionally includes a dual output DAC, wherein the dual output DAC includes the first signal generator and the second signal generator.

In Aspect 8, the supply voltage of any one or more of Aspects 1-7 optionally is less than or equal to 3.4 volts and the peak-to-peak voltage is greater than or equal to 3.5 volts.

In Aspect 9, the circuit of any one or more of Aspects 1-8 optionally in combination with the electrochemical sensor.

In Example 10, a method for controlling an electrochemical sensor can include receiving a supply voltage at a control circuit, in a diagnostic mode of operation, generating a sensor diagnostic signal at the control circuit using the supply voltage, wherein the sensor diagnostic signal is a periodic signal, in a sensing mode, receiving a signal from a working electrode of the electrochemical sensor at the control circuit, provide an indication of a material concentration at an output of the control circuit using the signal, and wherein a peak-to-peak voltage of the sensor diagnostic signal is greater than the supply voltage.

In Aspect 11, the generating the sensor diagnostic signal of any one or more of Aspects 1-10 optionally includes generating a first waveform for a reference electrode of the electrochemical sensor using a first signal generator of the control circuit.

In Aspect 12, the generating a sensor diagnostic signal of any one or more of Aspects 1-11 optionally includes generating a second waveform for a diagnostic electrode of the electrochemical sensor using a second signal generator of the control circuit.

In Aspect 13, the generating a first waveform of any one or more of Aspects 1-12 optionally includes generating a first pattern of voltage ramps and voltage steps applied to one of the reference electrode or the diagnostic electrode.

In Aspect 14, the generating a second waveform of any one or more of Aspects 1-13 optionally includes generating a second pattern of voltage steps applied to the other one of the reference electrode or the diagnostic electrode.

In Aspect 15, the generating the first waveform of any one or more of Aspects 1-14 optionally includes generating the first waveform at a first output of a dual output digital-to-analog converter DAC.

In Aspect 16, the generating the second waveform of any one or more of Aspects 1-15 optionally includes generating the second waveform at a second output of the dual output digital-to-analog converter.

In Aspect 17, the supply voltage of any one or more of Aspects 1-16 optionally is provided by a battery, and wherein the peak-to-peak voltage is greater than or equal to a voltage of the battery.

In Aspect 18, a control circuit for an electrochemical sensor can include power supply inputs configured to receive a supply voltage, means for receiving control information, means for applying a first waveform to a reference electrode of the electrochemical sensor during a diagnostic mode of operation using the supply voltage and the control information, means for applying a second waveform to a diagnostic electrode of the electrochemical sensor during a diagnostic mode of operation using the supply voltage and the control information, means for receiving sense information from the electrochemical sensor, means for providing an indication of a material concentration using the sense information during a sense mode of operation, and wherein, during the diagnostic mode of operation, a diagnostic waveform measured at the reference electrode and the diagnostic electrode includes a periodic signal having a peak-to-peak voltage greater than the supply voltage.

In Aspect 19, the control circuit of any one or more of Aspects 1-18 optionally includes means for switching a source of the sense information to the means for providing an indication of a material concentration between the sense mode of operation and the diagnostic mode of operation.

In Aspect 20, the supply voltage of any one or more of Aspects 1-19 optionally is provided by a battery, and wherein the peak-to-peak voltage is greater than or equal to a voltage of the battery.

Each of these non-limiting examples can stand on its own, or can be combined in various permutations or combinations with one or more of the other examples.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

The claimed invention is:

1. A method for controlling an electrochemical sensor, the method comprising:
   receiving a supply voltage at power supply inputs of a control circuit;
   in a diagnostic mode of operation, generating a sensor diagnostic signal at the control circuit using the supply voltage, wherein the sensor diagnostic signal is a periodic signal;
   in a sensing mode, receiving a signal from a working electrode of the electrochemical sensor at the control circuit; and
   providing an indication of a material concentration at an output of the control circuit using the signal;
   wherein a peak-to-peak voltage of the sensor diagnostic signal is greater than the supply voltage.

2. The method of claim 1, wherein the generating the sensor diagnostic signal includes generating a first waveform for a reference electrode of the electrochemical sensor using a first signal generator of the control circuit.

3. The method of claim 2, wherein the generating a sensor diagnostic signal includes generating a second waveform for a diagnostic electrode of the electrochemical sensor using a second signal generator of the control circuit.

4. The method of claim 3, wherein the generating a first waveform includes generating a first pattern of voltage ramps and voltage steps applied to one of the reference electrode or the diagnostic electrode.

5. The method of claim 4, wherein the generating a second waveform includes generating a second pattern of voltage steps applied to the other one of the reference electrode or the diagnostic electrode.

6. The method of claim 3, wherein generating the first waveform includes generating the first waveform at a first output of a dual output digital-to-analog converter DAC.

7. The method of claim 6, wherein generating the second waveform includes generating the second waveform at a second output of the dual output digital-to-analog converter.

8. The method of claim 3, wherein the supply voltage is provided by a battery.

9. A method for controlling an electrochemical sensor, the method comprising:
receiving a supply voltage;
in a diagnostic mode, generating a sensor diagnostic signal using the supply voltage, wherein the sensor diagnostic signal is a periodic signal and wherein a peak-to-peak voltage of the sensor diagnostic signal is greater than the supply voltage; and
in a sensing mode, based on a signal from a working electrode of the electrochemical sensor, generating an indication of a material concentration.

10. The method of claim 9, wherein the generating the sensor diagnostic signal includes generating a first waveform for a reference electrode of the electrochemical sensor.

11. The method of claim 10, wherein the generating a sensor diagnostic signal includes generating a second waveform for a diagnostic electrode of the electrochemical sensor.

12. The method of claim 11, wherein the generating a first waveform includes generating a first pattern of voltage ramps and voltage steps applied to one of the reference electrode or the diagnostic electrode.

13. The method of claim 12, wherein the generating a second waveform includes generating a second pattern of voltage steps applied to the other one of the reference electrode or the diagnostic electrode.

14. The method of claim 11, wherein generating the first waveform includes generating the first waveform at a first output of a dual output digital-to-analog converter DAC.

15. The method of claim 14, wherein generating the second waveform includes generating the second waveform at a second output of the dual output digital-to-analog converter.

16. The method of claim 11, wherein the supply voltage is provided by a battery.

17. A method for operating an electrochemical sensor, the method comprising:
receiving a supply voltage;
receiving control information; and
during a diagnostic mode of operation:
based on the supply voltage and control information, applying a first waveform to a reference electrode of the electrochemical sensor and applying a second waveform to a diagnostic electrode of the electrochemical sensor; and
generating a diagnostic waveform at the reference electrode and the diagnostic electrode, the diagnostic waveform including a periodic signal having a peak-to-peak voltage greater than the supply voltage.

18. The method of claim 17, further comprising:
during a sense mode of operation:
receiving sense information from the electrochemical sensor; and
providing an indication of a material concentration using the sense information.

19. The method of claim 17, wherein the generating a first waveform includes generating a first pattern of voltage ramps and voltage steps applied to one of the reference electrode or the diagnostic electrode.

20. The method of claim 19, wherein the generating a second waveform includes generating a second pattern of voltage steps applied to the other one of the reference electrode or the diagnostic electrode.

* * * * *